Figure 1:
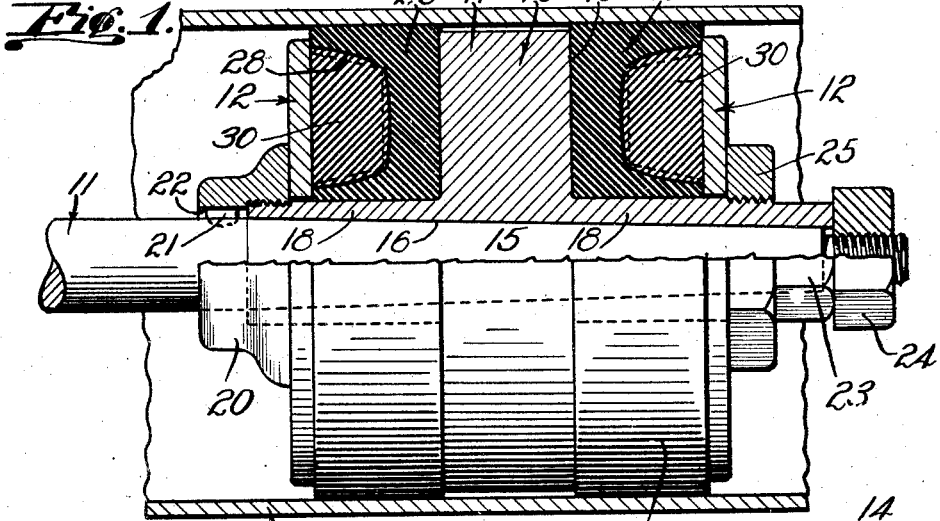

April 17, 1934.    H. N. WAYNE    1,955,157
PISTON
Filed Jan. 31, 1931    2 Sheets-Sheet 2
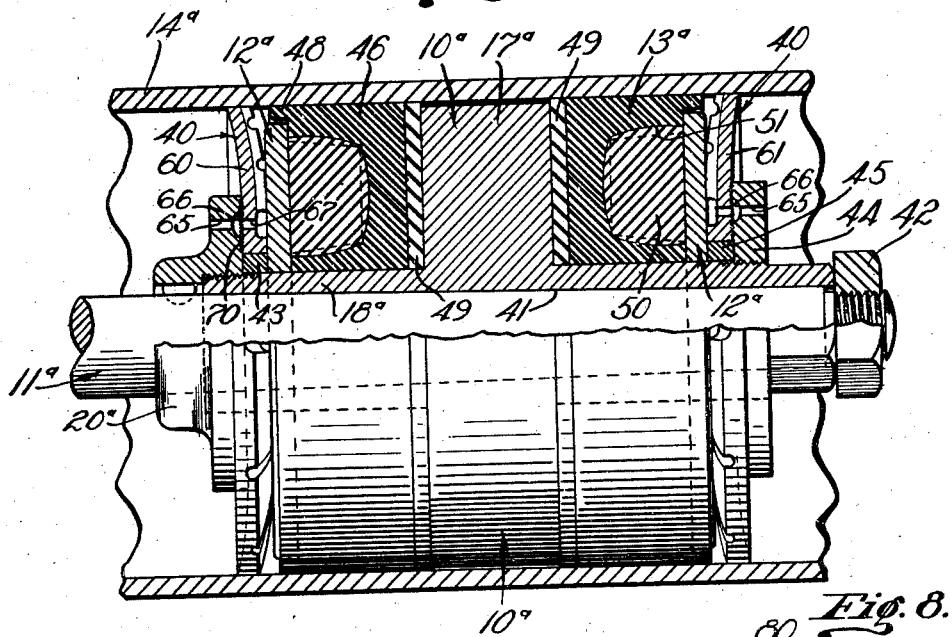
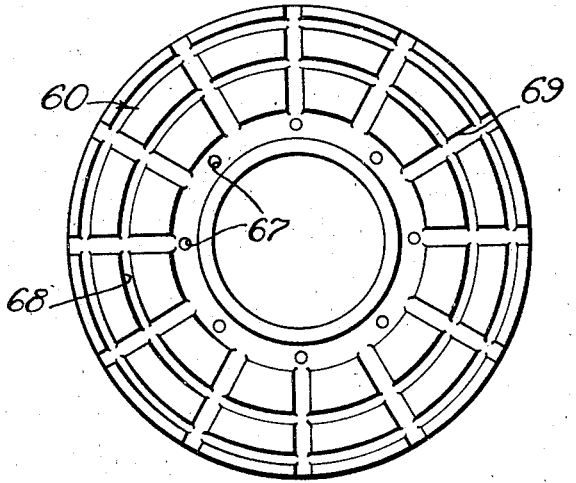
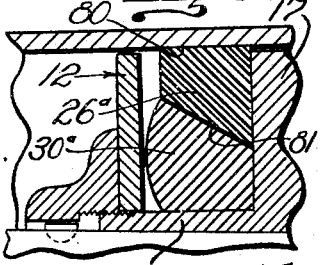
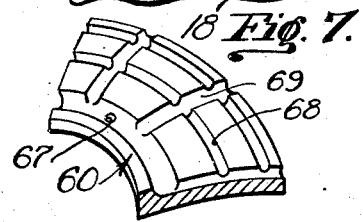
Inventor
Herbert N. Wayne:
By
His Attorney April 17, 1934.　　　H. N. WAYNE　　　1,955,157

PISTON

Filed Jan. 31, 1931　　2 Sheets-Sheet 1

Inventor
Herbert N. Wayne,
By
His Attorney

Patented Apr. 17, 1934

1,955,157

UNITED STATES PATENT OFFICE 1,955,157

PISTON

Herbert N. Wayne, Santa Monica, Calif.

Application January 31, 1931, Serial No. 512,574

10 Claims. (Cl. 309—36)

This invention relates to pistons, and relates more particularly to pistons for use in pumps, or the like. It is a general object of the invention to provide a simple, practical, and effective pump piston.

The present invention is capable of embodiment in pistons for use in various types of mechanisms; however, it is particularly well suited for embodiment in pistons for slush pumps for handling rotary mud or circulation fluid employed in the drilling of wells. Throughout the following detailed description, the invention will be disclosed in forms particularly adapted for use in slush pumps. It is to be understood, however, that the invention is not to be taken as restricted or limited to the particular forms or applications about to be described, but is to be taken as including any features or modifications that may fall within the scope of the claims.

The rotary mud or circulation fluid used in well drilling operations usually contains a substantial proportion of solid matter, which acts to abrade or cut out the pistons of the slush pumps. In the drilling of deep wells, for example, oil wells and gas wells, the rotary mud is forced or pumped into the wells at high pressures, making it necessary to provide the slush pump pistons with packing to tightly seal with the walls of the pump cylinders. The packing of slush pump pistons is usually in the nature of rubber, or a rubber composition, and considerable difficulty has been encountered in maintaining the packing in effective sealing engagement with the cylinder walls. Further, the solid matter in the rotary mud becomes embedded in the piston packing, or becomes lodged on the packing between the piston and walls of the cylinder and abrades and cuts out the packing so that it soon becomes ineffective.

It is an object of the invention to provide a piston that embodies expansible packing which is maintained in effective sealing engagement with the cylinder walls by a body of resilient compressible material held in pressural engagement with the packing.

It is another object of the invention to provide a piston that includes an improved packing means which consists of resilient expansible packing for sealing with the walls of the cylinder, and another, or second, resilient body of packing material held under pressure and subjected to the pressures at the heads of the piston and operable to yieldingly urge and expand the sealing packing into effective engagement with the cylinder walls and with the core or body of the piston.

It is another object of the invention to provide a piston of the character mentioned that embodies improved means for adjusting or compressing the packing.

It is another object of the invention to provide a piston for a slush pump, or the like, that includes improved packing which is not subjected to the action of the abrasive solid matter in the fluid handled.

It is a further object of the invention to provide a slush pump piston that includes means for preventing solid matter or abrasives in the fluid from reaching the piston packing.

It is another object of the invention to provide a piston of the character mentioned which includes a wiping element or squeegee for slidably engaging the walls of a cylinder to wipe or carry the solid matter ahead of the piston packing, so that it cannot act on or cut out the packing.

A further object of the invention is to provide a piston of the character mentioned that is simple and inexpensive of manufacture and in which the packing and squeegees are readily replaceable.

Figure 2:
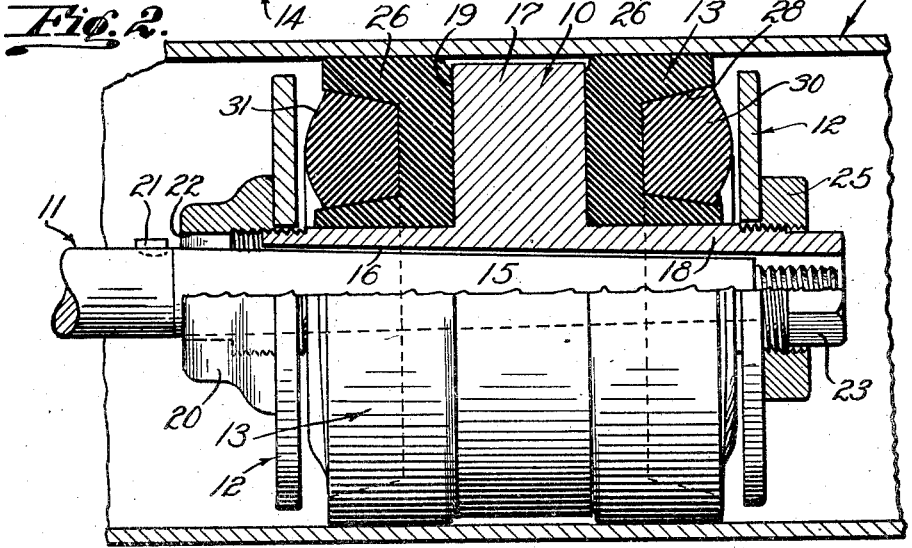
Figure 3:
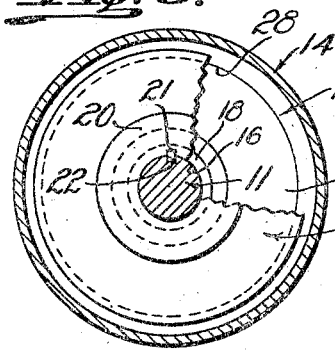
Figure 4:
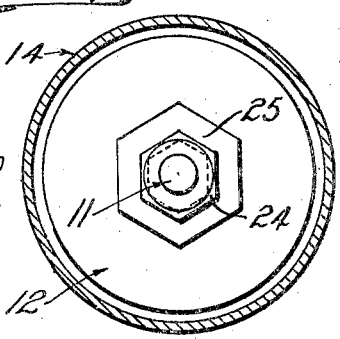

Other objects and features of my invention will be best and more fully understood from the following detailed description of typical forms and applications of the invention, throughout which description reference will be had to the accompanying drawings, in which:

Fig. 1 is a view of one form of the invention, showing it in operative position in a cylinder with the upper portion broken away to show in cross section. Fig. 2 is a view similar to Fig. 1, illustrating the parts loosely arranged on the piston rod before being assembled to the positions illustrated in Fig. 1. Fig. 3 is a reduced view of the outer end of the piston, showing certain parts broken away. Fig. 4 is a reduced view of the inner end of the piston. Fig. 5 is a view of another form of the invention with the upper portion broken away to show in cross section. Fig. 6 is a side view of a squeegee provided by the present invention. Fig. 7 is a perspective view of a portion of a squeegee, and Fig. 8 is a fragmentary sectional view of a piston, illustrating a modified packing means.

The embodiment of the invention illustrated in Figs. 1 to 4 inclusive of the drawings includes, generally, a core or body 10 adapted to be mounted on a piston rod 11, heads or end plates 12 at the opposite ends of the body 10, and packing means 13 for sealing with the walls of a cylinder 14.

The piston body 10 may be varied considerably for use on piston rods of various characters. In the drawings, I have illustrated a typical piston rod 11 having a longitudinally tapered portion 15 adjacent its inner end for carrying the body 10. The extreme inner end of the rod 15 is of reduced diameter and is screw-threaded. The piston body 10 is removably mounted on the tapered portion 15 of the piston rod and is provided with a central longitudinally tapered opening 16 for receiving or co-operating with the tapered portion 15 of the rod. The body 10 is provided with an annular radially projecting flange 17. The flange 17 is substantially midway between the opposite ends of the piston body, and cylindrical parts 18 project outwardly in opposite directions from the base of the flange, forming the end parts of the body. The flange 17 is preferably of slightly less diameter than the cylinder 14, and its sides or ends 19 are parallel and normal to the longitudinal axis of the body to form effective abutments for the packing means 13, as will be hereinafter described.

The invention provides improved means for removably retaining the body 10 on the piston rod and for expanding or compressing the packing means 13. A nut 20 is provided on the piston rod 11 at the termination of the tapered portion 15. The nut 20 may freely fit the rod 11, and a sliding key connection is provided between the nut 20 and the rod. In the preferred form of the invention, a key 21 is provided on the rod 11 to extend into a keyway 22 in the nut to hold the nut against rotation on the rod. The outer end of the body 10, or the outer cylindrical part 18, is screw-threaded into the nut 20. In assembling the piston, relative rotary movement between the body 10 and the rod 11 operates to thread the outer part 18 into the nut 20. The extreme inner end 23 of the body is polygonal to receive a wrench or suitable tool for assembling or disassembling the piston. A nut 24 is threaded on the reduced inner end of the piston rod 11 to engage the inner end of the body 10 and retain the piston body on the tapered portion 15 of the piston rod.

The heads or end plates 12 are arranged at the opposite ends of the body 10 and engage or seat against the packing means 13. The end plates 12 may be alike in construction and are slidable on the cylindrical end parts 18 of the body. The nut 20 retains the outer end plate 12 in pressural engagement with the packing means 13. A head nut 25 is screw-threaded on the inner cylindrical body part 18 to clamp against the inner end plate 12.

A packing means 13 is provided at each end of the body 10 between an end plate 12 and an end 19 of the body flange 17. The two packing means 13 are of like construction and each includes a body 26 of packing for sealing with the walls of the cylinder 14. The packing 26 is removably mounted on the cylindrical parts 18 and seats against the ends 19 of the flange. In accordance with the invention, the packing 26 is formed in integral annular bodies which completely surround the piston body 10. The peripheries of the bodies of packing 26 are preferably cylindrical to slidably seal with the walls of the cylinder 14. The packing 26 may be formed of rubber, or a suitable rubber composition that is readily expansible and yet has sufficient inherent rigidity to form an effective, long-wearing sealing means. The two bodies of packing 26 are removably retained on the body 10 and may be replaced as units.

The packing means 13 includes a novel and effective means for maintaining the packing 26 in an expanded state and in effective pressural sealing engagement with the walls of the cylinder 14 and with the body 10. The packing 26 is proportioned to seat on the parts 18 and to contact with the walls of the cylinder, and each packing body is provided with an opening in the form of an annular groove or recess 28 in its outer end. The bottoms or inner ends of the recesses 28 may be flat and normal to the longitudinal axis of the body, while the side walls of the recesses diverge outwardly toward the ends of the piston. Each of the recesses 28 is occupied by or carries a yielding and resilient body 30 of material for expanding the packing 26. The expanding material 30 may be formed of rubber, and may be considered as being more resilient than the packing 26. The bodies 30 are formed of an alive elastic material having a substantial degree of elasticity. By "alive elastic material" I mean yielding, resilient and elastic rubber, or its substitutes as distinguished from steel, leather and other materials that are only slightly elastic. The term rubber as applied to the packing 26 and the bodies 30 is meant to include rubber, rubber compositions, and substitutes therefor. The inner sides of the end plates 12 completely cover the outer ends of the expanding members 30 and operate to maintain the members 30 under compression and expanded. The expanding rubber members 30, as initially formed, may have convexed or rounded outer ends 31 which project beyond the ends of the packing 26 prior to the final assembling of the piston on the rod 11. Upon the body 10 being threaded into the nut 20, the packing expanding member 30 at the outer end of the piston is compressed against the head 12 and expands the packing 26 at the outer end of the piston so that it seats tightly on the body 10 and effectively engages the cylinder walls. When the nut 25 is threaded on the body, the end plate 12 at the inner end of the piston is forced against the yielding and expanding body 30 to compress it into the recess and expand the packing body 26 at the inner end of the piston. The bodies 30 of yielding material may be removably seated in the recesses 28 and may be easily and quickly removed upon the piston being disassembled. Fig. 2 of the drawings illustrates the initial configuration of the recesses 28 and the expanding members 30, while Fig. 1 illustrates their configuration when the parts are in the operative positions. The broken lines in the recesses 28 in Fig. 1 of the drawings indicate the normal or initial configuration of the grooves or recesses. It will be apparent that the compressed yielding members 30 act as springs to constantly expand the packing 26 outwardly against the cylinder walls and inwardly against the body so that an effective seal is maintained at all times.

It is believed that the utility and practicability of the form of the invention illustrated in Figs. 1 to 4 of the drawings will be readily apparent from the foregoing detailed description. The parts may be assembled on the piston rod 11, in the manner illustrated in Fig. 2 of the drawings. Threading of the outer end of the body into the nut 20 compresses the outer packing member 30 against the end plate 12. When the nut 25 is threaded onto the body, the end plate 12 is forced against the resilient member 30 to expand the packing 26 at the inner end of the piston. The nut 24 operates to tightly wedge or seat the body on the tapered portion 15 of the piston rod and to retain the piston assembly on the piston rod. The end plates 12 are slidable on the end portions 18 of the piston body, and pressures occurring in the pump cylinder act on the end plates 12 to compress the members 30, as well as the packing 26, to force the packing into effective pressural engagement with the cylinder walls and to form sealing contact with the body of the piston. The resilient members 30, being held under pressure and expanded, operate to maintain the packing 26 in sealing engagement with the cylinder walls and with the ends 19 of the flange and with the cylindrical parts 18. It is to be noted that the body 10 may be threaded into the nuts 20 and 25 and that the nuts 20 and 25 may be adjusted to further compress the packing means and compensate for its wear.

In Fig. 8 of the drawings, I have illustrated a modified form of packing means. In this form of the invention, the packing 26ª is annular, having a cylindrical periphery 80 to contact with the cylinder walls. The opposite ends of the packing 26ª may be radial, the inner end seating against the shoulder 17, and the outer end to be engaged by the end plate 12. The interior or inner wall 81 of the annular packing 26ª is spaced from the cylindrical part 18 of the piston body and may be tapered or inclined downwardly and inwardly from its outer edge to its inner edge. The means for expanding the packing 26ª and for forming a seal between the packing and piston body includes a body 30ª of resilient material arranged between the packing 26ª and the cylindrical part 18. The expanding member 30ª may be formed of rubber or rubber composition and may be more resilient than the packing 26ª. The member 30ª is removably seated on the cylindrical part 18 and its inner end engages the flange 17. The exterior or periphery of the expanding member 30ª is inclined or tapered to effectively engage or co-operate with the interior 81 of the packing 26ª. As initially formed, the member 30 may be proportioned so that its outer end projects beyond the end of the packing 26ª and may be rounded or convexed as illustrated in the drawings. Upon the end plate 12 being clamped against the assembly of the packing 26ª and the member 30ª, the member 30ª is compressed or forced into tight sealing engagement with the cylindrical part 18 and the flange 17 and expands the packing 26ª outwardly into effective sealing contact with the cylinder walls. The co-operation between the inclined interior 81 of the packing and the periphery of the member 30ª is effective in causing radial expansion of the packing against the cylinder walls and lateral expansion of the packing against the flange 17.

The form of the invention illustrated in Figs. 5 to 7 of the drawings includes, generally, a body 10ª mounted on a piston rod 11ª, end plates or heads 12ª, packing means 13ª, and a squeegee or wiping means 40 at each end of the piston for preventing solid matter, in the fluid being pumped, from reaching the packing 13ª.

The body 10ª may be of the same construction as the body 10 described above, i. e., it may consist of cylindrical end portions 18ª and a radial flange 17ª. The body 10ª is provided with a central longitudinal tapered opening 41 for receiving the piston rod 11ª, and the outer end of the body may be threaded into a nut 20ª on the rod. A nut 42 may be screw-threaded on the extreme inner end of the piston rod 11ª to retain the body on the rod.

The end plates 12ª are slidably carried on the cylindrical parts 18ª of the piston body and seat against the ends of the packing means 13ª. In this embodiment of the invention, a washer 43 is carried on the body part 18ª between the nut 20ª and the outer end plate 12ª. The inner end plate 12ª is clamped against the packing 13ª by means of a nut 44 threaded on the body. A washer 45 is arranged between the nut 44 and the end plate 12ª.

The packing means 13ª may be similar, generally, to the packing means 13 described above. The packing means 13ª includes an annular body of packing 46 arranged at each end of the body between an end plate 12ª and the flange 17ª. The packing 46 is formed of rubber, or a suitable rubber composition, and is provided to seal with the walls of the cylinder. In this embodiment of the invention, an annular lip or flange 48 projects from the outer end of each body of packing 46. The lips 48 are provided at the peripheries of the packing and slidably engage the cylinder walls. A backing 49 may be provided on each body of packing 46 to seat against the end of the flange 17ª. The backing 49 may be in the nature of comparatively rigid rubber, and is provided to reinforce the packing structure. In practice, the backing 49 may be integral with or vulcanized onto the packing 46.

The packing means 13ª includes resilient expanding members 50 arranged in annular grooves or recesses 51 in the outer ends of the packing 46. The resilient expanding members 50 may be identical with the members 30 described above and are held under compression in the recesses 51 by the end plates 12ª.

The wiping means or squeegees 40 are provided to slidably engage and wipe the walls of the cylinder to carry the solid matter ahead of the piston so that it cannot become lodged on the packing 46. The wiping means 40 includes a squeegee 60 arranged between the nut 20ª and the outer end plate 12ª, and a squeegee 61 arranged between the nut 44 and the inner end plate 12ª. The squeegees 60 and 61 are in the nature of annular members formed of rubber. The squeegee 60 seats on the washer 43, and its periphery is slidable on the interior of the cylinder 14ª. The squeegee 61 surrounds the washer 45 and its periphery slidably engages the cylinder walls. The squeegees 60 and 61 are proportioned so that their peripheries are in pressural engagement with the walls of the cylinder and so that they are bent or bowed axially, as clearly illustrated in Fig. 5 of the drawings. It will be apparent that the squeegees 60 and 61 wipe the solid matter from the walls of the cylinder so that it cannot reach the packing 46 or become lodged between the packing and the walls of the cylinder.

The invention provides means for equalizing the fluid pressures at the opposite sides of the squeegees 60 and 61 and for permitting the fluid pressures occurring in the cylinder to act upon the end plates 12ª and the packing 46. A plurality of circumferentially spaced openings 65 are provided in the nuts 20ª and 44. The openings 65 communicate with annular grooves 66 in the inner sides of the nuts. The squeegees 60 and 61 are provided with spaced openings 67 to communicate with the grooves 66. A plurality of spaced circular or annular grooves 68 are provided in the inner sides of the squeegees. One of the grooves 68 of each of the squeegees occurs at the inner ends of the openings 67 to receive fluid from the openings. A multiplicity of spaced radial grooves 69 are formed in the inner sides of the squeegees to extend between the innermost grooves 68 and their peripheries. The grooves 69 intersect the several grooves 68 so that the fluid pressure may act evenly on the inner sides of the squeegees. It will be apparent that fluid under pressure passed through the openings 65 and 67 may act upon the heads 12ª and the packing 46. Means is provided for screening or straining the fluid passed behind the squeegees 60 and 61. Annular pieces or sections 70 of screening are arranged between the squeegees 60 and 61 and the nuts 20ª and 44 at the inner ends of the grooves 66. The screening 70 filters or strains the fluid entering behind the squeegees so that particles of solid matter cannot reach the packing 46 or prevent the effective operation of the squeegees.

In the form of the invention illustrated in Figs. 5 to 7 of the drawings, the squeegees 60 and 61 positively prevent the solid matter contained in the fluid being handled from abrading or cutting out the packing 46. The fluid pressure acting on the heads 12ª operates to compress the packing 46 and to maintain the lip 48 in sealing engagement with the cylinder walls. As the fluid pressure at the opposite sides of the squeegees is equalized, the squeegees are not subjected to distortion or excessive wear.

Having described only typical preferred forms of my invention, I do not wish to limit myself to the specific details set forth, but wish to reserve to myself any changes or variations that may appear to those skilled in the art or fall within the scope of the following claims.

Having described my invention, I claim:

1. A piston including a body having a radial shoulder, an annular body of expansible packing surrounding the body and seated against the shoulder, there being an annular recess in the outer end of the said body of packing spaced from both the periphery and the interior surface of the packing and means for maintaining the packing in an expanded state including, elastic material in the annular recess in the end of the packing, the said elastic material normally being of greater volume than the recess, a head on the body, and means for clamping the head against the packing to compress it against the shoulder and to compress the resilient material to be substantially within the recess.

2. A piston including a body, an expansible packing member surrounding the body, there being an annular recess in an end of the packing member spaced between the periphery and the interior surface of the packing member, and means for expanding the packing member including elastic material in the said recess, the walls of the recess being divergent, the elastic material normally being of greater volume than the recess and means for maintaining the elastic material under compression to be substantially wholly within the recess and expand the packing through its elasticity.

3. A piston including a body, an expansible packing member surrounding the body, there being an annular recess in an end of the packing member spaced between the periphery and the interior surface of the packing member, and means for expanding the packing member including, elastic material in the said recess, the walls of the recess being divergent, the elastic material normally being of greater volume than the recess and means for maintaining the resilient material under compression, to be substantially wholly within the recess and expand the packing through its elasticity the last mentioned means including a head on the body engaging the elastic material, and screw means for operating the head.

4. A piston for use on a piston rod including, a body having an opening for passing the rod and having a radial shoulder, a nut on the rod, the end of the body being threaded into the nut, expansible packing on the body seated against the shoulder, and a head on the body engaged by the nut and adapted to be clamped against the packing upon threading of the body into the nut to compress the packing.

5. A piston for use on a piston rod including, a body having an opening for passing the rod and having a radial flange intermediate its ends, expansible packing means on each end of the body seated against the flange, a nut on the rod, one end of the body being threaded into the nut, a head shiftable on the body and engaging one of the packing means and operable to compress the said packing upon the body being threaded into the nut, a head on the body for engaging the other packing means, and a nut threaded on the body for clamping the last mentioned head against the packing means.

6. A piston including a body having a radial shoulder, an annular body of expansible packing surrounding the body and seated against the shoulder, and means for maintaining the packing in an expanded state including, resilient material in an annular recess in an end of the packing, a comparatively rigid backing on the packing engaging the shoulder, a head on the body, and means for clamping the head against the packing to compress it against the shoulder and to compress the resilient material.

7. A piston including, a body, packing on the body for sealing with the walls of a cylinder, a squeegee carried on the body at a point spaced from the packing for wiping the cylinder walls, means for admitting fluid into the space between the squeegee and the packing, and means for straining the fluid admitted by said means.

8. A piston for use in a cylinder including a body having an abutment, elastic expansible packing on the body having an end to be compressed against the abutment, the packing having spaced annular flanges on its other end, one flange for sealing with the wall of the cylinder, the other flange for sealing with the body, an elastic compressible ring in the space between said flanges normally of greater volume than the space between said flanges, the ring having a greater degree of elasticity than the packing, and means for compressing said ring to be completely contained in said space and cause compression of the packing and to maintain the flanges in sealing engagement with the wall of the cylinder and with the body.

9. A piston for use in a cylinder including a body having an abutment, expansible packing on the body having an end to be compressed against the abutment, the packing having spaced annular flanges on its other end, one flange for sealing with the wall of the cylinder, the other flange for sealing with the body, an elastic compressible ring in the space between said flanges normally of greater volume than the space between said flanges, and a plate clamped against the said ring to compress the ring so that it is substantially completely contained in said space to cause compression of the packing and to maintain said flanges in sealing positions.

10. A piston for use in a cylinder including a body having an abutment, expansible packing on the body having an end to be compressed against the abutment, the packing having spaced annular flanges on its other end, one flange for sealing with the wall of the cylinder, the other flange for sealing with the body, an elastic compressible ring in the space between said flanges normally of greater volume than the space between said flanges, and an imperforate plate for engaging said ring and packing for protecting the packing and said ring against the destructive compressive action of the fluid in the cylinder, and mechanical means for forcing the plate against the ring to compress the ring and packing and to maintain the said flanges in sealing positions, said means being operable to compress the ring completely within said space.

HERBERT N. WAYNE.